US009463720B2

(12) United States Patent
Balensiefer, II et al.

(10) Patent No.: US 9,463,720 B2
(45) Date of Patent: Oct. 11, 2016

(54) CHILD SAFETY SEAT WITH SAFETY BELT ADJUSTMENT MECHANISM

(71) Applicant: Inspired Products Group, LLC, Studio City, CA (US)

(72) Inventors: Eugene R. Balensiefer, II, Tipton, IN (US); James W. Holley, Jr., Colorado Springs, CO (US)

(73) Assignee: Inspired Products Group, LLC, Studio City, CA (US)

( * ) Notice: Subject to any disclaimer, the term of this patent is extended or adjusted under 35 U.S.C. 154(b) by 72 days.

(21) Appl. No.: 14/337,635

(22) Filed: Jul. 22, 2014

(65) Prior Publication Data

US 2016/0023579 A1 Jan. 28, 2016

(51) Int. Cl.
*A47C 1/08* (2006.01)
*B60N 2/28* (2006.01)
*B60N 2/26* (2006.01)

(52) U.S. Cl.
CPC ............ *B60N 2/2806* (2013.01); *B60N 2/265* (2013.01); *B60N 2/2812* (2013.01)

(58) Field of Classification Search
CPC ... B60N 2/3806; B60N 2/265; B60N 2/2806
USPC ..................... 297/250.1, 254, 482
See application file for complete search history.

(56) References Cited

U.S. PATENT DOCUMENTS

| | | | | |
|---|---|---|---|---|
| 4,913,490 A * | 4/1990 | Takahashi | ............ | B60N 2/2821 297/130 |
| 5,458,398 A * | 10/1995 | Meeker | .................. | B60N 2/286 297/250.1 |
| 5,527,094 A * | 6/1996 | Hiramatsu | ........... | B60N 2/2806 297/250.1 |
| 5,964,502 A * | 10/1999 | Stephens | .............. | B60N 2/2812 297/250.1 |
| 6,079,780 A * | 6/2000 | Bapst | .................... | B60N 2/2806 116/200 |
| 6,336,682 B1 * | 1/2002 | Rosko | .................. | B60N 2/2803 297/250.1 |
| 6,450,576 B1 * | 9/2002 | Rhein | .................. | B60N 2/2806 297/250.1 |
| 6,779,842 B2 * | 8/2004 | McNeff | ................ | B60N 2/2806 297/250.1 |
| 7,648,209 B2 * | 1/2010 | Weinstein | ............ | B60N 2/2866 297/250.1 |
| 7,735,920 B2 * | 6/2010 | Hinze | .................. | B60N 2/2806 280/801.1 |

* cited by examiner

*Primary Examiner* — Laurie K Cranmer
(74) *Attorney, Agent, or Firm* — Bever, Hoffman & Harms, LLP

(57) ABSTRACT

A child safety seat assembly includes a seat shell that is secured to a vehicle seat by way of a standard safety belt system, and a belt adjustment mechanism that facilitates adjusting the horizontal belt path taken by the standard safety belt through the safety seat assembly such that the horizontal belt path aligns with a child's center of gravity (CG). In a first fixed state, the belt adjustment mechanism generates a lower horizontal belt path that is a relatively short distance from the seat base portion, thereby optimizing the seat assembly for securing shorter children or infants having lower CGs. As a child grows, the belt adjustment mechanism is adjusted into a second fixed state that maintains the horizontal belt path at a relatively long distance from the seat base portion, thereby optimizing the seat assembly for securing taller children having higher CGs.

16 Claims, 14 Drawing Sheets

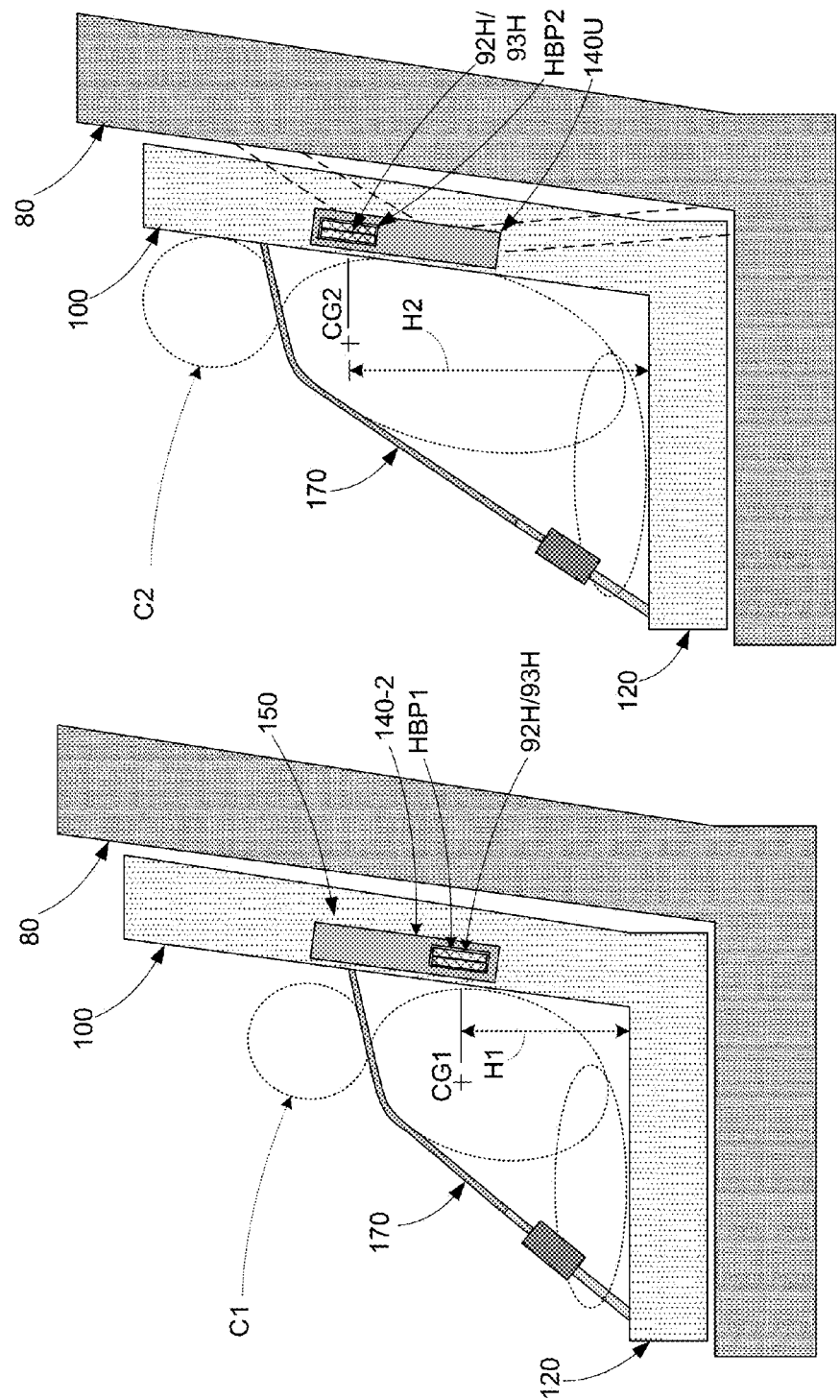

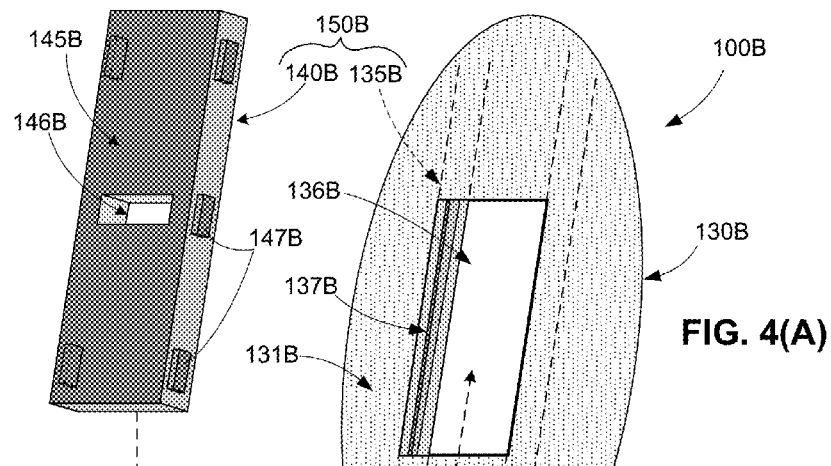
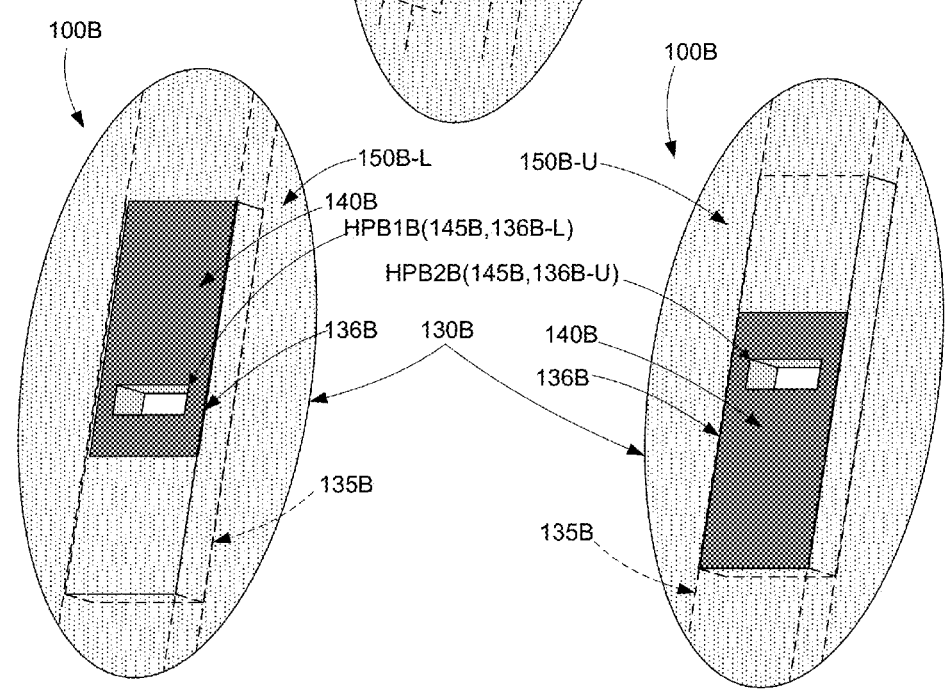
FIG. 4(A)
FIG. 4(B)          FIG. 4(C)

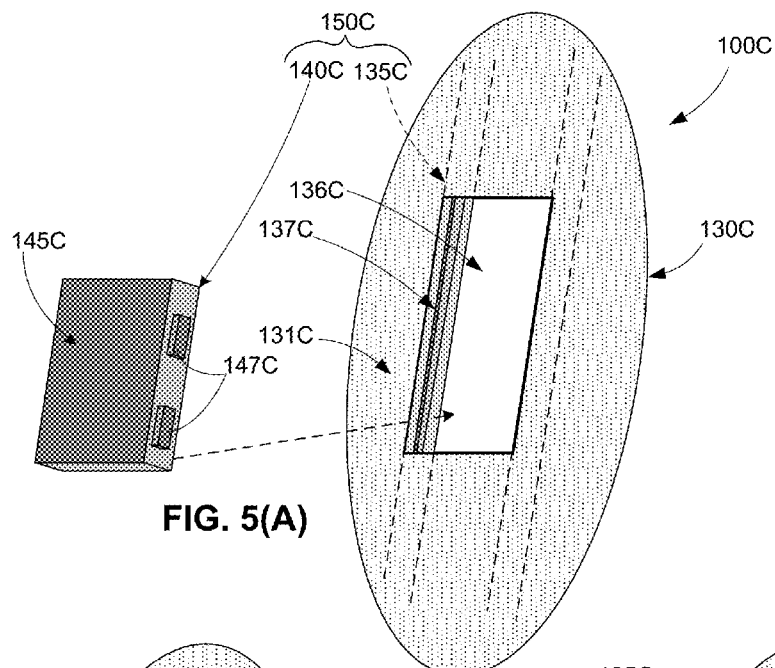
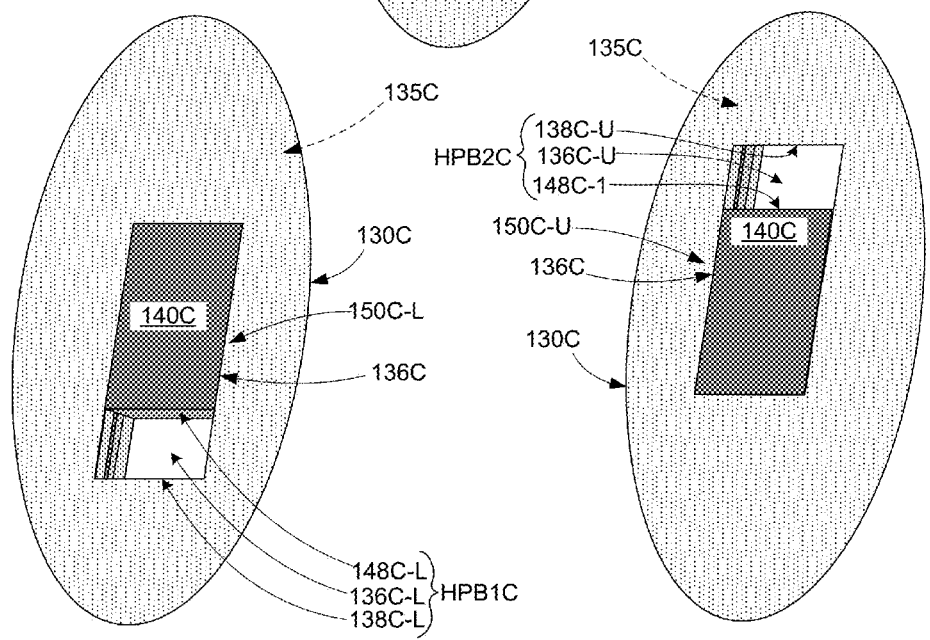
FIG. 5(A)
FIG. 5(B)
FIG. 5(C)

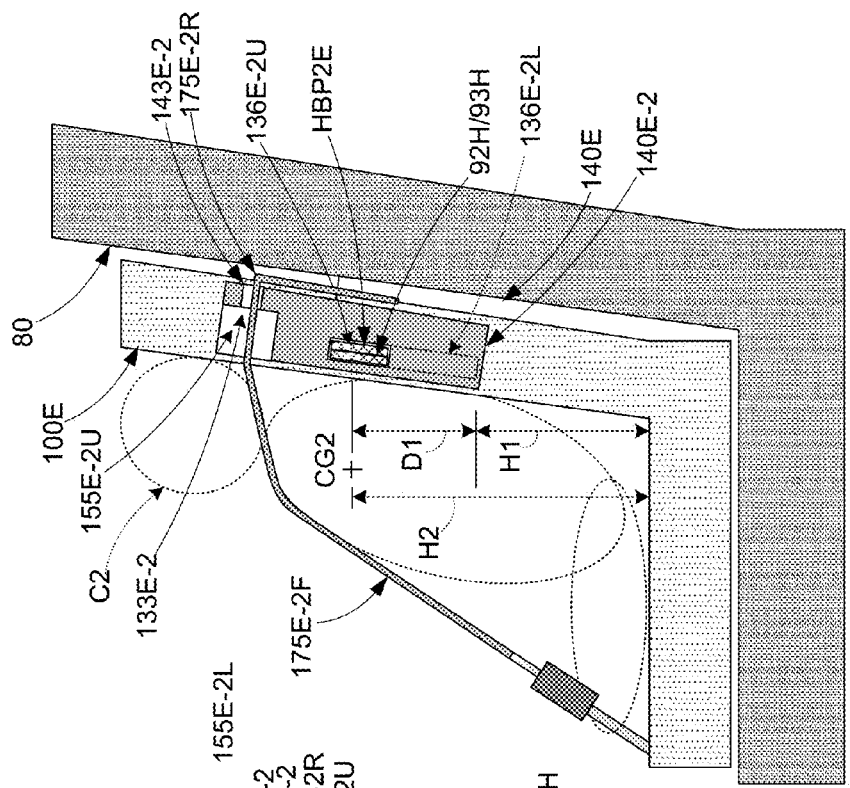
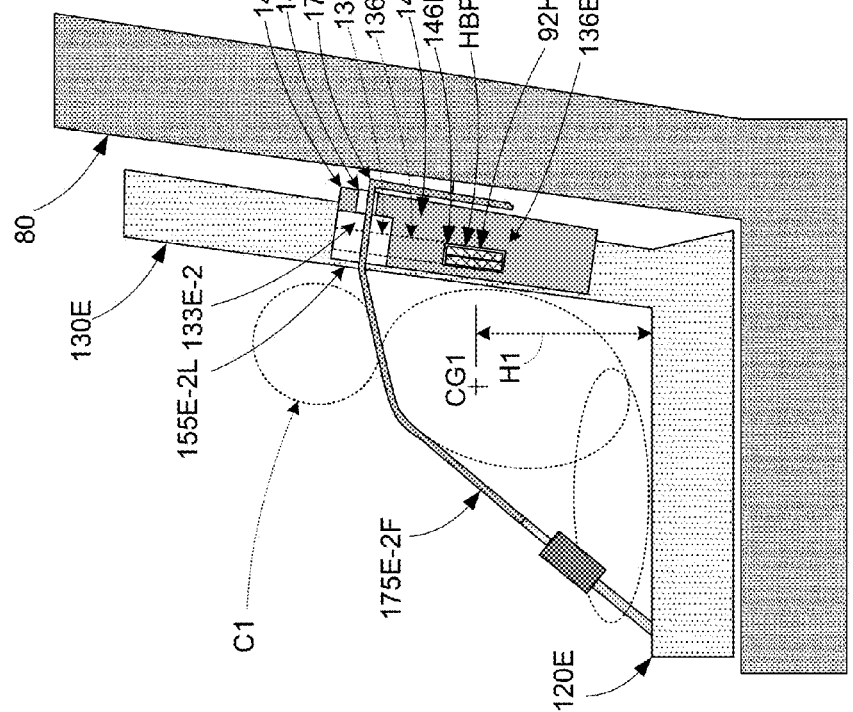

CHILD SAFETY SEAT WITH SAFETY BELT ADJUSTMENT MECHANISM

FIELD OF THE INVENTION

The present invention relates generally to child safety and restraint devices. More specifically, the present invention relates to child safety seats and associated harness systems.

BACKGROUND OF THE INVENTION

Child safety seats (sometimes referred to as safety seat, child restraint system, and restraint car seat) are seats designed specifically to protect children from injury or death during collisions. These seats are typically purchased and mounted by consumers over an existing vehicle seat (e.g., a car seat), and are secured to the vehicle seat by way of the vehicle's seat belt harness. Many regions require children defined by age, weight, and/or height to use a specific government-approved child safety seat, resulting is several classes of child safety seats including rear-facing baby (or infant) car seats for children up to 2 years, and front-facing safety seats (sometimes referred to as "booster seats") for children to age 9 or 90 lbs. The present invention particularly pertains to front-facing safety seats.

All child safety seats must pass rigorous compliance testing before sale to consumers is authorized, for example, by the National Highway Traffic Safety Administration. One area of compliance testing involves measuring chest acceleration and head excursion during rapid deceleration, which measured by strapping a test dummy into a proposed child safety seat product, and then simulating a frontal crash at a regulated speed (e.g., 35 miles per hour). If the test dummy experiences chest acceleration above a predetermined minimum amount (e.g., 60 G's or more), or experiences head excursion greater than a predetermined distance, then the proposed child safety seat product fails testing and is not authorized for sale to the public.

FIGS. 10(A) and 10(B) are simplified perspective views showing a child safety seat 20 as it is mounted and attached to a standard vehicle (car) seat 80 using a conventional single-fixed belt guide approach.

As indicated in FIG. 10(A), vehicle seat 80 includes a base portion 82, an upright (back) portion 83, and is operably disposed relative to an associated safety belt system 90, which would be used in the absence of safety seat 20 to secure an adult passenger to vehicle seat 80 according to known techniques. Specifically, standard safety belt system 90 includes a belt 91 having a shoulder portion 92 that is typically secured at its upper end to a retractor mechanism (not shown), a lap portion 93 that is secured to a first lower anchor (not shown), and a buckle 94 that is detachably received into a buckle latching mechanism 98, which is anchored by way of a short belt 97 to a second lower anchor point (not shown).

Child safety seat 20 generally includes a seat shell 30 having a seat base portion 32 and a seat upright (back) portion 33 that form a seating area S, and a harness system 40 for securing a child to the seat shell 30 in seating area S. Harness system 40 typically includes two belts 45-1 and 45-2 that are secured upper ends to upright portion 33, and secured at lower ends to seat base portion 32, buckles 46-1 and 46-2 that are slidably connected to belts 45-1 and 45-2, respectively, and a quick-release buckle latching mechanism 48, which is secured to seat base portion 32 by way of a center belt strap 47.

According to the conventional single-fixed belt guide approach, safety belt system 90 is utilized to secure safety seat 20 to vehicle seat 80 by way of a pair of guides (or openings) 34-1 and 34-2 are formed in the seat upright portion 33 of safety seat 20. Specifically, as indicated in FIG. 10(B), a portion of belt 91 including buckle 94 is fed through guide 34-1, passed along a horizontal belt path HBP defined between guide 34-1 and guide 34-2, and fed back out of guide 34-2. With safety seat 20 mounted onto vehicle seat 80 in the manner shown in FIG. 10(B), buckle 94 is then secured into buckle latching mechanism 98, and shoulder belt portion 92 is pulled to take up any remaining slack, thereby securing safety seat 20 to vehicle seat 80. In this secured state, horizontal sections 92H and 93H of shoulder belt portion 92 and lap belt portion 93, respectively, are located in and extend substantially horizontally along horizontal belt path HBP, and are disposed behind seating area S (or in seating area S, but behind a seated child, not shown).

FIGS. 11(A) and 11(B) show safety seat 20 secured to vehicle seat 80 from a cross-sectional side view (i.e., viewing fixed horizontal belt path HBP along the length of horizontal belt sections 92H and 93H), and depict the change in a child's center of gravity (CG) as the child grows. FIG. 11(A) depicts a younger (smaller) child C1 secured in safety seat 20 by way of harness system 40, and FIG. 11(A) depicts an older (taller) child C2 (e.g., child C1 after a period of growth) secured in safety seat 20 by way of harness system 40. As indicated, younger child C1 has a center-of-gravity CG1 that is located at a first distance H1 above seat base portion 32, and older child C2 has a CG location CG2 that is at a second distance H2 above seat base portion 32, where second distance CG2 is greater than distance CG1. That is, as a child grows, the child's CG gradually changes from distance H1 to distance H2 (i.e., the child's CG moves further away from seat base portion 32).

As also indicated in FIGS. 11(A) and 11(B), the conventional single-fixed belt guide approach utilizes a fixed horizontal belt path HBP in which the distance H is typically located at an anticipated midpoint between the lower CG location CG1 of a younger (smaller) child C1 (shown in FIG. 11(A)), and the higher CG location CG2 of an older (taller) child C2 (shown in FIG. 11(B)). That is, fixed horizontal belt path HBP is typically set above lower CG location CG1 of a younger (smaller) child C1 (as shown in FIG. 11(A)), and below the higher CG location CG2 of an older (taller) child C2 (shown in FIG. 11(B)).

A problem with the conventional single-fixed belt guide approach is that utilizing a "midpoint" fixed horizontal belt path can result in injury to both very small and very large children (i.e., children whose center of gravity is below or above the fixed horizontal belt path). That is, the present inventors have determined through extensive experimentation that risk of injury is only minimized when a child's CG is vertically aligned with the fixed horizontal belt path. Specifically, when a child's CG is below the fixed horizontal belt path (as depicted in FIG. 11(A), where CG1 has a height H1 that is below height H of fixed horizontal belt path HBP), the present inventors have determined through experimentation that the younger/smaller child can be subjected to substantially higher chest acceleration during a sudden vehicle deceleration (e.g., during a crash) than would be experienced if the child's CG were vertically aligned with the fixed horizontal belt path. Conversely, when a child's CG is above the fixed horizontal belt path (as depicted in FIG. 11(B)), the present inventors have determined through experimentation that the older/taller child is subjected to greater head excursion during a sudden deceleration, which can result in neck injury, than would be experienced if the child's CG were vertically aligned with the fixed horizontal belt path.

Another problem with the conventional single-fixed belt guide approach is that, because the conventional approach includes only a single-fixed belt guide, there is no way for the conventional approach to minimize risk of injury as a child grows. That is, if a conventional safety seat were provided with a single-fixed belt guide having a relatively low fixed horizontal belt path, then the conventional safety seat may be optimized for a younger/smaller child (i.e., when the child's CG is relatively close to the seat base and aligned with the lower fixed horizontal belt path), but the lower fixed horizontal belt path becomes more and more problematic as the child grows (i.e., as the distance between the child's CG and the seat base gradually increases), thereby subjecting the growing child to gradually increasing head excursion that can result in neck injury. Conversely, if a conventional safety seat were provided with a single-fixed belt guide having a relatively high fixed horizontal belt path, then the conventional safety seat may be optimized for the child when older/larger, but the higher fixed horizontal belt path would be problematic when the child is young (i.e., when the horizontal belt path is higher than the child's CG, as indicate in FIG. 11(A)), thereby subjecting the child to higher chest acceleration during a crash.

What is needed is a child safety seat that avoids the problems associated with the conventional single-fixed belt guide approach. Specifically, what is needed is a child safety seat with a seat belt adjustment mechanism that facilitates vertical adjustment the horizontal belt path with a child's center of gravity, and is economical to produce and easy to use.

SUMMARY OF THE INVENTION

The present invention is directed to a child safety seat assembly including a seat shell and a belt adjustment mechanism that facilitates vertical adjustment of the horizontal belt path along which a vehicle safety belt passes through the seat assembly when securing the child safety seat to a car seat. According to the present invention, the belt adjustment mechanism includes two belt-positioning openings disposed on opposite sides of the seat shell, and includes two positioning members that are adjustably connected to the seat shell (e.g., by way of associated mounting structures) such that the positioning members are movable between at least two fixed states relative to the belt-positioning openings (e.g., between a lowered (first) fixed state and a raised (second) fixed state). When the belt adjustment mechanism is configured such that the positioning members are disposed in the first (e.g., lowered) fixed state, the positioning members respectively obstruct first (e.g., upper) portions of the belt-positioning openings and expose second (e.g., lower) portions of the belt-positioning openings, whereby a "lowered" horizontal belt path is formed between the exposed (lower) belt position opening portions at a relatively short (first) vertical distance from the seat base portion, and whereby connection of the child safety seat assembly to the vehicle seat is optimized for a smaller child or an infant. In contrast, when the belt adjustment mechanism is reconfigured such that the positioning members are disposed in the second (e.g., raised) fixed state, the positioning members respectively obstruct the second (e.g., lower) portions of the belt-positioning openings and expose the first (e.g., upper) portions of the belt-positioning openings, whereby a "raised" horizontal belt path is formed between the exposed (upper) belt position opening portions at a relatively long (second) vertical distance from the seat base portion, and whereby connection of the child safety seat assembly to the vehicle seat is optimized for an older/taller child. By adjusting belt adjustment mechanism between the two or more fixed states, the horizontal belt path is adjusted between two or more vertical distances from the seat's base portion, thereby facilitating vertical alignment of the horizontal belt path and a child's center of gravity (CG) as the child grows. Because the belt adjustment mechanism allows a parent to easily and intuitively set the horizontal belt path in two or more positions, the child safety seat assembly of the present invention facilitates optimal positioning of the vehicle safety belt as their child grows, thereby minimizing chest acceleration and head/knee excursion in the event of a collision to avoid possible injury stemming from incorrectly positioned vehicle safety belts that can occur with the conventional single-fixed belt guide approach.

According to alternative practical embodiments of the present invention, the belt adjustment mechanism is implemented using a one of a removable-type belt adjustment mechanism and a sliding-type belt adjustment mechanism. Removable-type belt adjustment mechanisms include at least one removable (e.g., block-type or bracket-type) positioning member having an engaging structure (e.g., a protuberance) that is snap-coupled or otherwise engaged and secured with a corresponding engaging structure (e.g., a notch) of a socket (securing means) that is formed on the periphery of an associated belt-positioning opening on the seat upright portion. In one specific embodiment, a belt hole is disposed adjacent to one end of each removable positioning member that cooperates with the upper/lower portions of the belt-positioning opening facilitate passage of the shoulder belt strap. An advantage of removable-type belt adjustment mechanisms is that this approach facilitates highly intuitive adjustment between two or more different fixed states by way of removing and rotating or otherwise orienting the removable member to position the belt hole at a desired (e.g., lower or upper) vertical position relative to the seat base portion. Sliding-type belt adjustment mechanisms include slide-type positioning members including engaging structures that are operably connected to one or more rail structures (e.g., slots) formed in the seat shell, where the slide-type positioning member is slidably restrained in the rail structure such that it is movable between two or more fixed positions over the belt-positioning opening. An advantage of sliding-type belt adjustment mechanisms over removable-type mechanism is that the slide-type positioning member remains connected to the seat shell at all times, thereby preventing possible misplacement/loss of the sliding member. In alternative specific embodiments, the slide-type positioning members either define belt holes, or utilize a solid block-like structure that is positioned to alternatively obstruct upper/lower portions of the belt-positioning openings.

According to another embodiment, a child safety seat assembly includes a bracket-type belt adjustment mechanism including a single-piece (preferably integrally molded plastic, substantially U-shaped bracket that includes two integrally connected belt-guide flanges (positioning members) disposed at opposite ends of a connecting structure. When the bracket is operably mounted on the seat shell, the connecting structure extends horizontally across the back surface of the seat upright portion, and the belt-guide flanges (positioning members) respectively simultaneously extend over associated belt-positioning openings formed on an associated seat shell. The bracket is movably (i.e., slidably or removably) connected to the seat upright portion in a horizontal position, whereby the belt-guide flanges (positioning members) are maintained at the same horizontal level (vertical height) when the bracket is attached to the seat shell, and are positioned to respectively obstruct upper or lower portions of the belt-positioning openings when the bracket is in the lowered or raised fixed states, respectively. The bracket-type approach minimizes manufacturing costs, and provides an intuitive structure that is easily manipulated to adjust the horizontal belt path, thereby greatly improving the likelihood that the seat assembly will be properly reconfigured as a child grows. The bracket is preferably slidaby connected to the seat shell to provide the further benefit of minimizing the risk of loss of the bracket (which can occur when the bracket is removable from the seat shell). The bracket also includes an optional locking mechanism that engages associated locking structures formed on the seat shell when the bracket is in the different fixed states, whereby the bracket remains rigidly secured to the seat upright portion.

According to yet another embodiment, a child safety seat assembly includes another bracket-type belt adjustment mechanism in which belt holes are respectively defined in the two integrally connected belt-guide flanges (positioning members) that form (in conjunction with corresponding belt-positioning openings) opposite ends of the horizontal belt path. With this arrangement, when the bracket is disposed in a lowered fixed state, upper portions of the first and second positioning members respectively obstruct upper portions of the first and second belt-positioning openings, and the horizontal belt path is formed through lower portions of the belt-positioning openings and the belt holes. Conversely, when the bracket is disposed in a raised fixed state, lower portions of the positioning members respectively obstruct the lower portions of the belt-positioning openings, and the horizontal belt path is formed through upper portions of the belt-positioning openings and the belt holes. An advantage of this arrangement is that, by providing the belt-positioning openings as a single elongated opening or a series of openings, the horizontal belt path can be set at a large number of vertical distances from the seat base portion, thereby facilitating more precise alignment between the horizontal belt path and a child's center of gravity.

According to yet another embodiment, a child safety seat assembly includes a bracket-type belt adjustment mechanism that facilitates simultaneous and coordinated adjustment of both the safety belt (i.e., the horizontal belt path) and the vertical anchor point at which shoulder harness straps extend from the seat upright portion for securing over the child's shoulders. The belt holes are formed in the positioning members as described above, and the harness slots are defined through the connecting structure and align with corresponding harness openings formed in the upright portion of the seat shell. With this arrangement, when the bracket is operably mounted onto said seat shell the harness slots align with corresponding portions of the elongated shoulder harness openings to define vertical anchor point openings through which the shoulder harness straps extend from the upright portion. In addition, because both the harness slots and belt holes are formed on the same rigid bracket structure, when the bracket is adjusted from the lowered fixed state to the raised fixed state (i.e., such that a vertical height of the belt holes above the seat base portion is increased by a corresponding (first) distance, the vertical height of the vertical anchor point openings above the seat base portion is simultaneously increased by the same (first) distance. By positioning the harness slots a predetermined offset distance above the belt holes, the horizontal belt path is automatically simultaneously adjusted upward each time a parent adjusts the harness should straps to accommodate growth of their child, thereby minimizing the chance of injury due to misalignment between the horizontal belt path and the child's center of gravity.

BRIEF DESCRIPTION OF THE DRAWINGS

These and other features, aspects and advantages of the present invention will become better understood with regard to the following description, appended claims, and accompanying drawings, where:

FIGS. 2(A) and 2(B) are side views showing the safety seat assembly in the alternative fixed adjustment states of FIGS. 1(A) and 1(B), respectively;

FIGS. 4(A), 4(B) and 4(C) are partial perspective views showing a first sliding-type belt adjustment mechanism according to another simplified practical embodiment of the present invention;

FIGS. 5(A), 5(B) and 5(C) are partial perspective views showing a second sliding-type belt adjustment mechanism according to another simplified practical embodiment of the present invention;

FIGS. 9(A), 9(B) and 9(C) are simplified side views showing the child safety seat of FIG. 8 with the bracket-type belt adjustment mechanism in three different fixed operating states;

DETAILED DESCRIPTION OF THE DRAWINGS

The present invention relates to an improvement in child safety seats. The following description is presented to enable one of ordinary skill in the art to make and use the invention as provided in the context of a particular application and its requirements. As used herein, directional terms such as "upper", "upward", "lower", "lowered", "downward", "front", "rear", "back", "vertical" and "horizontal", are intended to provide relative positions for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
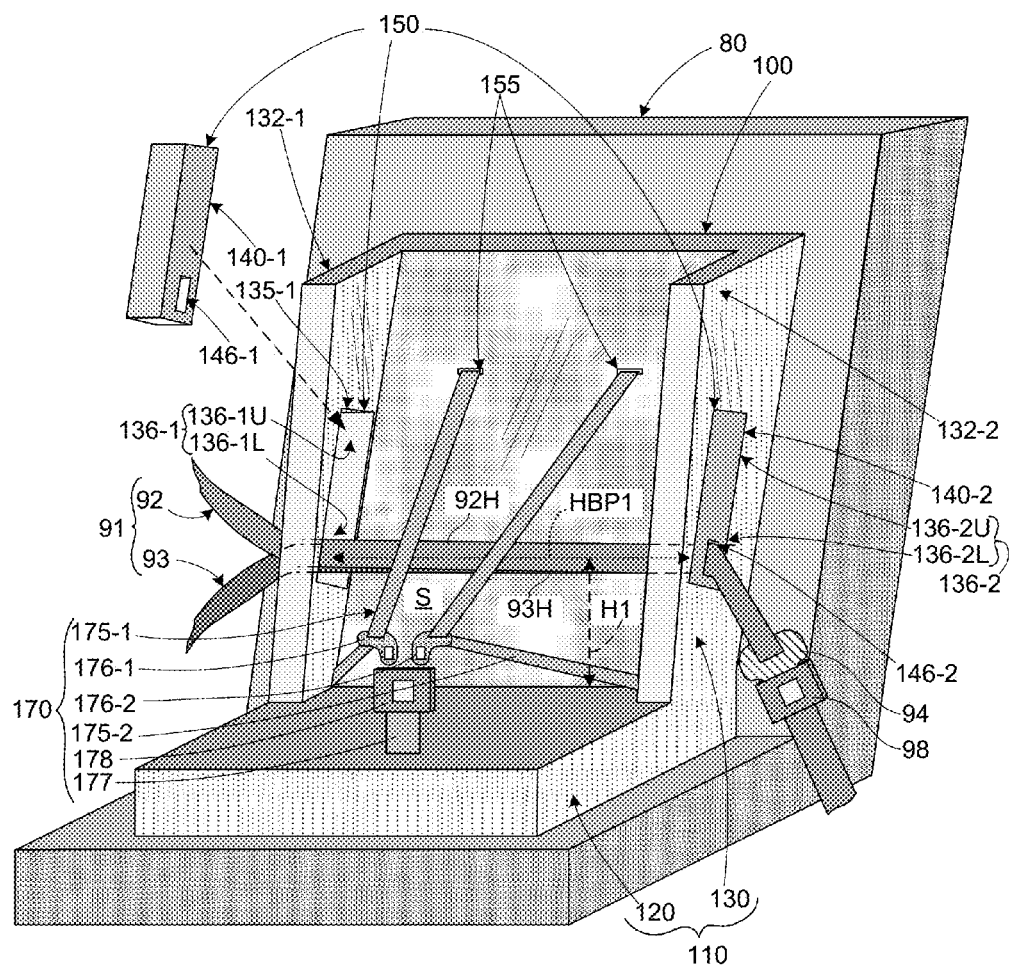
FIGS. 1(A) and 1(B) are top front perspective views showing a safety seat assembly mounted on a vehicle seat in alternative fixed adjustment states, respectively, according to an embodiment of the present invention.
Figure 1B:
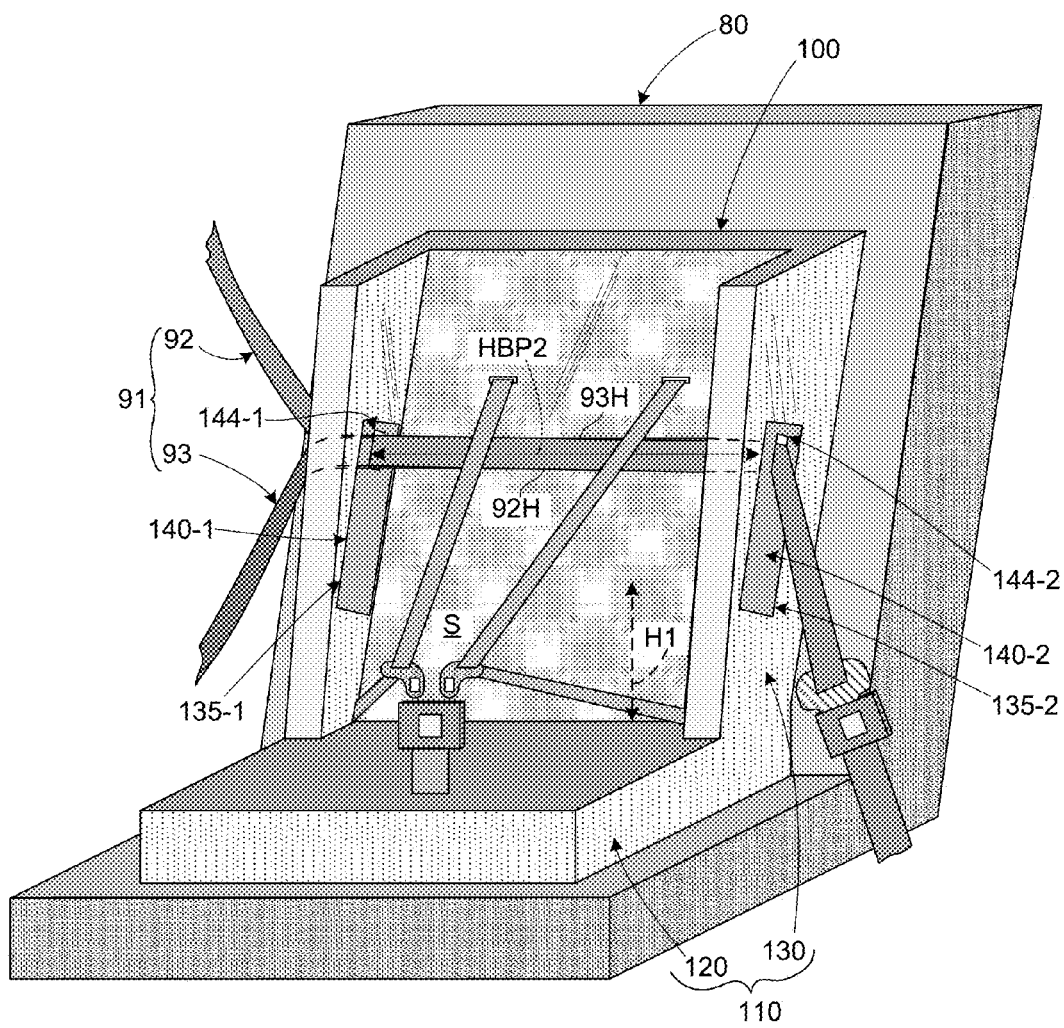

FIGS. 1(A) and 1(B) show a simplified child safety seat assembly 100 that is secured to a standard vehicle seat 80 by way of a standard vehicle safety belt 91. Child safety seat assembly 100 includes a seat shell 110, a belt adjustment mechanism 150, and an optional safety harness system 170.

Referring to the left side of FIG. 1(A), seat shell 110 generally includes a generally horizontal base portion 120 and a generally vertical upright portion 130 that extends upward from base portion 120. In a preferred embodiment, upright portion 130 includes both a seat back portion 131 and two side flanges 132-1 and 132-2 that combine with an upper surface of base portion 120 to define a semi-enclosed seating (passenger) area S into which a child is secured during use. In one embodiment seat shell 110 is a single (integral) plastic molded piece, and, in other embodiments (not shown), seat shell 110 consists of two or more plastic molded pieces that are assembled using known techniques.

Safety harness system 170 is operably attached to seat shell 110 in the manner described above with reference to the conventional safety seat, and is constructed and serves essentially identically to safety harness system 40 of conventional safety seat 20 to secure a child in seating area S. Specifically, two belt straps 175-1 and 175-2 extend upward from associated buckles 176-1 and 176-2 to vertical anchor points 155 disposed on upright portion 130, and lower portions that extend from buckles 176-1 and 176-2 to associated lower anchor points disposed on seat base portion 120. Buckles 96-1 and 96-2 are slidably secured to belt portion 175-1 and 175-2, and are operably constructed for locking attachment to a quick-release buckle latching mechanism 178, which is secured to seat base portion 120 by way of a center belt strap 177. Although safety harness system 170 is depicted in a simplified manner, it is understood that safety harness system 170 is constructed and attached to seat shell 110 in a known manner. For example, at the vertical (upper) anchor points 155, belt straps 175-1 and 175-2 pass through upright portion 130 by way of horizontally aligned slots, and then extend downward behind the seat upright portion to a tensioning device. To accommodate different sized children several sets of such slots are provided at different heights, such that vertical anchor points 155 can be raised to match a child's shoulder height as the child grows using known techniques.

Belt adjustment mechanism 150 includes at least two belt-positioning openings 136-1 and 136-2 respectively disposed on opposite sides of upright portion 130, and two (first and second) positioning members 140-1 and 140-2 that are adjustably connected to seat shell 110 by way of associated mounting structures (not shown) such that positioning members 140-1 and 140-2 respectively obstruct portions of belt-positioning openings 136-1 and 136-2. In one embodiment, belt-positioning openings 136-1 and 136-2 are formed in side flanges 132-1 and 132-2 of seat upright portion 130, respectively, and each comprises either a single elongated opening (e.g., as illustrated in FIG. 1(A)), or a multiple vertically aligned openings (e.g., as shown and described below with reference to FIG. 6). Positioning members (e.g., "left" positioning member 140-1 and "right" positioning member 140-2) are either separate structures (e.g., as illustrated in FIG. 1(A)), or integrally connected to form a single structure (e.g., as shown and described below with reference to FIG. 6). In either case, positioning members 140-1 and 140-2 are connected to shell 110 by way of associated mounting structures (e.g., "left" mounting structure 135-1 and "right" mounting structure 136-2).

In one embodiment, a peripheral shape of positioning members 140-1 and 140-2 is matched to the inside perimeter of belt-positioning openings 136-1 and 136-2, respectively, such that each positioning members are secured therein when mounted onto seat shell 110. For example, positioning member 140-1 is shown as being separated from shell 110, where member 140-1 is shaped to fit tightly inside belt-positioning opening 136-1 when mounted therein, as depicted by positioning member 140-2 which is mounted inside opening 136-2.

In accordance with an aspect of the present invention, positioning members 140-1 and 140-2 are secured to seat shell 110 such that positioning members 140-1 and 140-2 are adjustable (movable relative to seat shell 110) between at least two fixed states in order to provide an adjustable horizontal belt path along which portions 92H and 93H of standard safety belt 91 pass through belt-positioning openings 136-1 and 136-2 to secure seat assembly 100 to vehicle seat 80. Two exemplary fixed states are shown in FIGS. 1(A) to 2(B). FIGS. 1(A) and 2(A) show seat assembly 100 with belt adjustment mechanism 150 configured in a "lowered" (first) fixed state such that positioning members 140-1 and 140-2 form horizontal belt path HBP1 that is disposed at a relatively short distance H1 from base portion 120, thereby optimizing seat assembly 100 for a smaller child (e.g., a smaller child or an infant). In contrast, FIGS. 1(B) and 2(B) show seat assembly 100 with belt adjustment mechanism 150 configured in a "raised" (second) fixed state such that positioning members 140-1 and 140-2 form horizontal belt path HBP2 that is disposed at a relatively long distance H2 from base portion 120, thereby optimizing seat assembly 100 for a taller child (or after the smaller child/infant has grown). Although the description below involves two (i.e., "lowered" and "raised") fixed states, the present invention is not limited to two fixed states unless specifically specified in the claims.

Referring to FIGS. 1(A) and 2(A), when belt adjustment mechanism 150 is configured in the "lowered" fixed state, positioning member 140-1 and 140-2 are positioned to respectively obstruct upper (first) portions 136-1U and 135-2U of belt-positioning openings 136-1 and 136-2, respectively, and to expose lower (second) portions 136-1L and 136-2L of belt-positioning openings 136-1 and 136-2. In this "lowered" fixed state, when assembly 100 is secured to vehicle seat 80 by way of vehicle seat belt 91, belt portions 92H and 93H are constrained to pass between exposed lower portions 136-1L and 136-2L, thereby forming horizontal belt path HBP1 that is maintained at a relatively short (first) vertical distance H1 from base portion 120. FIG. 2(A) shows seat assembly 100 with a smaller child C1 secured therein by way of seat harness system 170, and shows belt adjustment mechanism 150 in the "lowered" fixed state configuration. Note that smaller child C1 has a center of gravity CG1 at substantially the same relatively short (first) vertical distance H1 from base portion 120. Accordingly, by configuring belt adjustment mechanism 150 into the "lowered" fixed state, seat assembly 100 is optimized for a smaller child C1.

Referring to FIGS. 1(B) and 2(B), when belt adjustment mechanism 150 is reconfigured (adjusted) from the "lowered" fixed state to the "raised" fixed state using any of the mechanisms described below, positioning member 140-1 and 140-2 are positioned to respectively obstruct lower (second) portions 136-1L and 135-2L of belt-positioning openings 136-1 and 136-2, respectively, and to expose upper (first) portions 136-1U and 136-2U of belt-positioning openings 136-1 and 136-2. In this "raised" fixed state, when assembly 100 is secured to vehicle seat 80 by way of vehicle seat belt 91, belt portions 92H and 93H are constrained to pass between exposed upper portions 136-1U and 136-2U, thereby forming horizontal belt path HBP2 that is maintained at a relatively long (second) vertical distance H2 from base portion 120 (i.e., distance H2 is greater than distance H1). FIG. 2(B) shows seat assembly 100 with a taller child C2 secured therein by way of seat harness system 170, and shows belt adjustment mechanism 150 in the "raised" fixed state configuration. Note that taller child C2 has a center of gravity CG2 at substantially the same relatively long (second) vertical distance H2 from base portion 120. Accordingly, by configuring belt adjustment mechanism 150 into the "raised" fixed state, seat assembly 100 is optimized for a taller child C2.

The belt adjustment mechanism introduced in FIG. 1 may be implemented using a variety of mechanism structures, including those described below, while remaining within the spirit and scope of the present invention. Unless characteristic features are specified, the appended claims are intended to cover the various belt adjustment mechanism embodiments that are set forth below (and their equivalents).

FIGS. 3(A) to 3(D) are partial perspective views showing a partial child safety seat assembly 100A in which an exemplary simplified belt adjustment mechanism 150A includes a removable-type positioning member 140A that is removably connected to a socket 135A formed on upright portion 130A of seat shell 110A. In the exemplary embodiment, upright portion 130A of seat shell 110A defines a rectangular through-hole (belt-positioning opening) 136A, and positioning member 140A comprises a block-shaped (rectangular) body structure 145A that entirely fills through-hole 136A when operably attached. In other embodiments (not shown), seat through-holes having other shapes and sizes may be used, and positioning member may be shaped to cover only a portion of the seat through-hole. In the exemplary embodiment, socket 135A is formed on a periphery of seat through-hole 136A (i.e., on the portion of seat material forming the peripheral edge of through-hole 136A) to minimize the size and material of positioning member 140A, but may be located away from through-hole 136A in other embodiments.

Figure 3A:
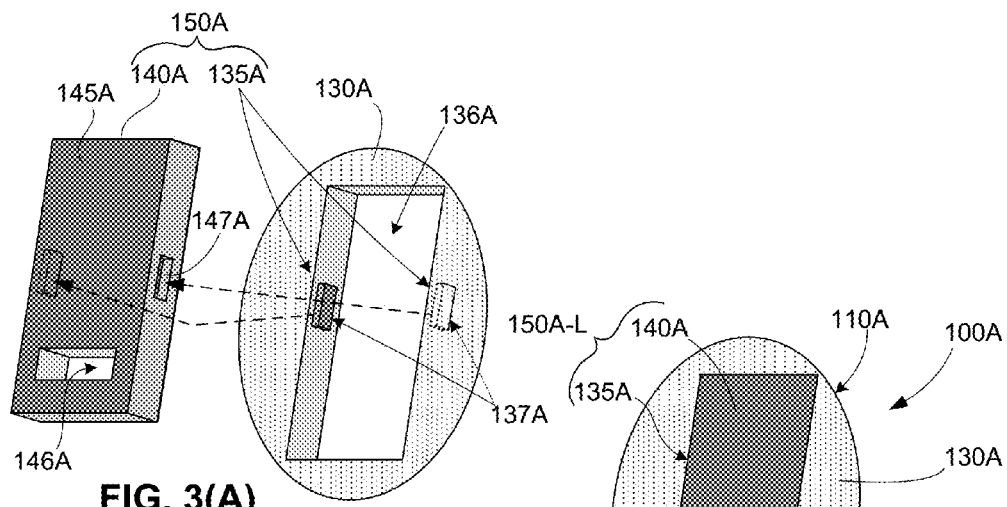
FIGS. 3(A), 3(B), 3(C) and 3(D) are partial perspective views showing a removable-type belt adjustment mechanism according to a simplified practical embodiment of the present invention.
Figure 3B:
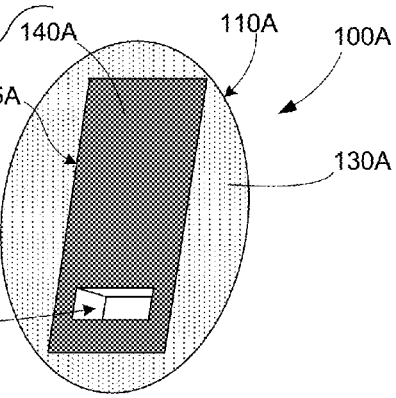
Figure 3C:
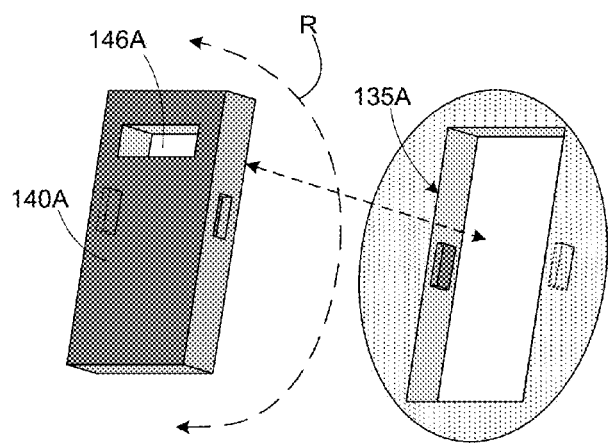

To facilitate removable connection, positioning member 140A includes (first) engaging structures 147A (e.g., notches), and socket 135A includes (second) engaging structures 137A (e.g., protrusions) that operably receive and engage engaging structures 147A when positioning member 140A is mounted onto upright portion 130A (i.e., operably engaged with socket 135A). For example, referring to FIG. 3(A), to mount positioning member 140A onto seat upright portion 130A, positioning member 140A is disposed over seat through-hole 136A and pressed inward, thereby causing engaging structures 137A to engage with engaging structures 137A, whereby positioning member 140A becomes fixedly secured as indicated in FIG. 3(C). Note that engaging structures 137A and 147A are greatly simplified for brevity, and those skilled in the art will recognize that many alternative engaging structures may be used, in addition to supporting flanges and fastening devices, in order to reliably maintain connection of positioning member 140A to seat upright portion 130A during operation.

Figure 3D:
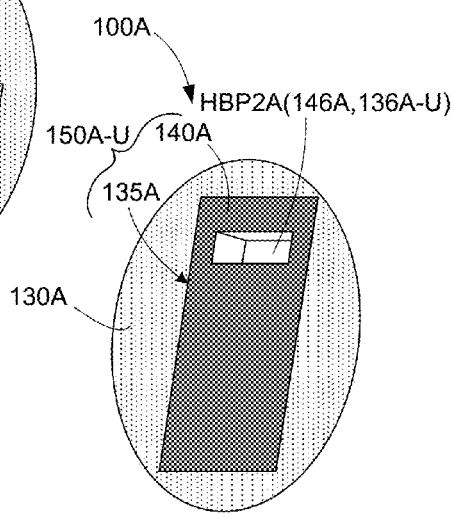

To facilitate selective adjustment of belt adjustment mechanism 150A between two fixed states, positioning member 140A defines a belt hole 146A disposed adjacent to one end of block-shaped body structure 145A. As indicated in FIG. 3(B), by orienting positioning member 140A such that belt hole 146A is disposed adjacent the lower end of upright portion 130A, belt adjustment mechanism 150A-L is configured in the lowered fixed state for securing smaller children (i.e., one end of the "lowered" horizontal belt path is formed by belt hole 146A in combination with "exposed" corresponding lower portion 136A-L of seat through-hole 136A). To subsequently reconfigure seat assembly 100A for a taller child, positioning member 140A is forcibly separated from socket 135A and rotated 180° (as indicated by arrow "R" in FIG. 3(C)) such that positioning member 140A is oriented with belt hole 146A disposed upward, and then positioning member 140A is re-connected into socket 135A. As indicated in FIG. 3(D), by orienting positioning member 140A such that belt hole 146A is disposed adjacent the upper end of upright portion 130A, belt adjustment mechanism 150A-U is configured in the raised fixed state for securing taller children (i.e., one end of the "raised" horizontal belt path is formed by belt hole 146A in combination with "exposed" corresponding upper portion 136A-U of seat through-hole 136A).

FIGS. 4(A) to 4(C) are partial perspective views showing a portion of a child safety seat assembly 100B including a simplified belt adjustment mechanism 150B formed by a slide-type positioning member 140B that is slidably engaged in a guide structure 135B formed on upright portion 130B of seat shell 110B. In the exemplary embodiment, upright portion 130B defines a rectangular seat through-hole (belt-positioning opening) 136B, and positioning member 140B comprises an elongated block-shaped (rectangular) body structure 145B that substantially fills through-hole 136B when operably attached. In other embodiments (not shown), seat through-holes having other shapes and sizes may be used, and positioning member may be shaped to cover only a portion of the seat through-hole.

To facilitate slidable connection, positioning member 140B includes engaging structures 147B (e.g., protrusions), and guide structure 135B is formed by rails 137B extending along peripheral side of seat through-hole 136B and into hollow sections disposed above and below seat through-hole 136B. As indicated in FIG. 4(A), positioning member 140B is mounted inside upright portion 130B during assembly using known techniques (e.g., as indicated by the dashed-line arrow) such that it remains slidably connected to seat shell 110B at all times.

To facilitate selective adjustment of belt adjustment mechanism 150B between two fixed states, positioning member 140B defines a belt hole 146B disposed adjacent to a central region of block-shaped body structure 145B. As indicated in FIG. 4(B), by sliding positioning member 140B downward along guide member 135B, belt hole 146B is located adjacent the lower end of upright portion 130B, and belt adjustment mechanism 150B-L is configured in the lowered fixed state for securing smaller children (i.e., a "lowered" horizontal belt path is formed by belt hole 146B in combination with "exposed" corresponding lower portion 136B-L of seat through-hole 136B). To subsequently reconfigure seat assembly 100B for a taller child, positioning member 140B is slid upward along guide structure 135B until positioning member 140B is disposed with belt hole 146B near the upper end of seat through-hole 136B. As indicated in FIG. 4(C), by disposing positioning member 140B such that belt hole 146B is located adjacent the upper end of upright portion 130B, belt adjustment mechanism 150B-U is configured in the raised fixed state for securing taller children (i.e., a "raised" horizontal belt path is formed by belt hole 146B in combination with "exposed" corresponding upper portion 136B-U of seat through-hole 136B).

FIGS. 5(A) to 5(C) are partial perspective views showing a portion of a child safety seat assembly 100C including a second exemplary belt adjustment mechanism 150C formed by a slide-type slide-type positioning member 140C that is slidably engaged in a guide structure 135C formed on upright portion 130C of seat shell 110C. Similar to the previous embodiment, upright portion 130C defines a rectangular seat through-hole (belt-positioning opening) 136C, and positioning member 140C comprises an elongated block-shaped (rectangular) body structure 145C that remains permanently attached to upright portion 130C, and slidable connection is implemented by way of protrusion-type engaging structures 147C that are received in slot-type rails 137C.

Belt adjustment mechanism 150C differs from the previous slide-type embodiment in that positioning member 140C includes a solid body structure 145C (i.e., no belt-opening is provided), and horizontal belt path "openings" are formed between opposing edges of body structure 145C and seat through-hole 136C. For example, as indicated in FIG. 5(B), by sliding positioning member 140C upward along guide member 135C, a "lowered" horizontal belt path opening is formed by "exposed" lower through-hole portion 136C-L, which is disposed between a lower edge 148C-L of positioning member 140C and a lower edge 138C-L of through-hole 136C. As indicated in FIG. 5(C), to subsequently reconfigure belt adjustment mechanism 150C for a taller child, positioning member 140C is slid downward along guide structure 135C, whereby a "raised" horizontal belt path opening is formed by an upper through-hole portion 136C-U disposed between an upper edge 148C-U of positioning member 140C and an upper edge 138C-U of through-hole 136C.

Figure 6:
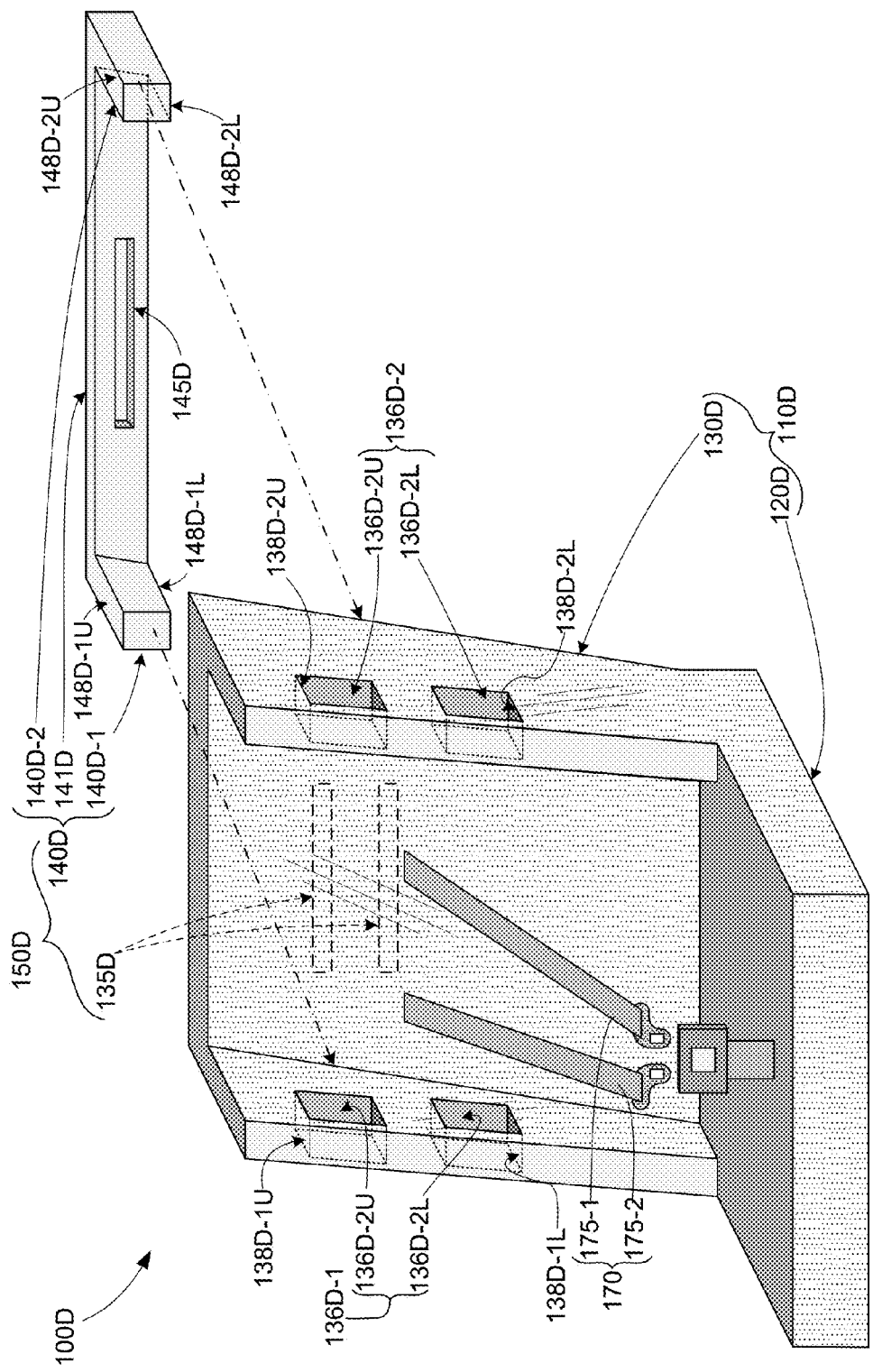
FIG. 6 is a top front perspective view showing a child safety seat including a simplified bracket-type belt adjustment mechanism according to another practical embodiment of the present invention.

FIG. 6 is an exploded perspective view showing a child safety seat assembly 100D according to another exemplary embodiment in which a belt adjustment mechanism 150D includes a bracket-type positioning member (bracket) 140D mounted on a seat shell 110D by way of a securing structure 135D (e.g., a series of locking ribs formed on a rear surface of seat shell 110D). Shell 110D includes a base portion 120D and an upright portion 130D that are formed and arranged in a manner similar to the embodiments described above, and defines two (first and second) elongated belt-positioning openings 136D-1 and 136D-2 disposed on opposite side flanges of upright portion 130D, with opening 136D-1 extending vertically between upper peripheral edge 138D-1U and lower peripheral edge 138D-1L and opening 136D-2 extending vertically between upper peripheral edge 138D-2U and lower peripheral edge 138D-2L. Belt-positioning openings 136D-1 and 136D-2 generally include lower regions 136D-1L and 136D-2L and upper regions 136D-1U and 136D-2U, respectively. Safety harness system 170 is arranged and operates in the manner described above with reference to FIG. 1, and includes two (first and second) harness straps 175-1 and 175-2 and an associated buckle mechanism.

According to the present embodiment, bracket 140D is characterized by having spaced-apart (first and second) belt-guide flanges 140D-1 and 140D-2 that are respectively disposed and integrally connected to opposite ends of a connecting structure 141D, thereby forming a nominally U-shaped structure. Bracket 140D is preferably an integrally molded, single-piece, rigid plastic structure, but may be formed from other suitable rigid materials such as metal, and may be formed by assembling (fastening together) two or more structures. Bracket 140D is configured such that, when operably mounted onto seat shell 110, belt-guide flanges 140D-1 and 140D-2 are respectively positioned to cover associated (e.g., upper or lower) regions of belt-positioning openings 136D-1 and 136D-2, and connecting structure 141D extends across a back surface of seat shell 110D. Bracket 140D is preferably slidably connected to a rear surface of the seat upright portion 130D such that bracket 140D remains connected to seat shell 110D when moved between different fixed states, but may also include a removable-type mechanism. When a slide-type mechanism is used, a locking mechanism is provided to secure the bracket in the desired fixed state position.

Figure 7:
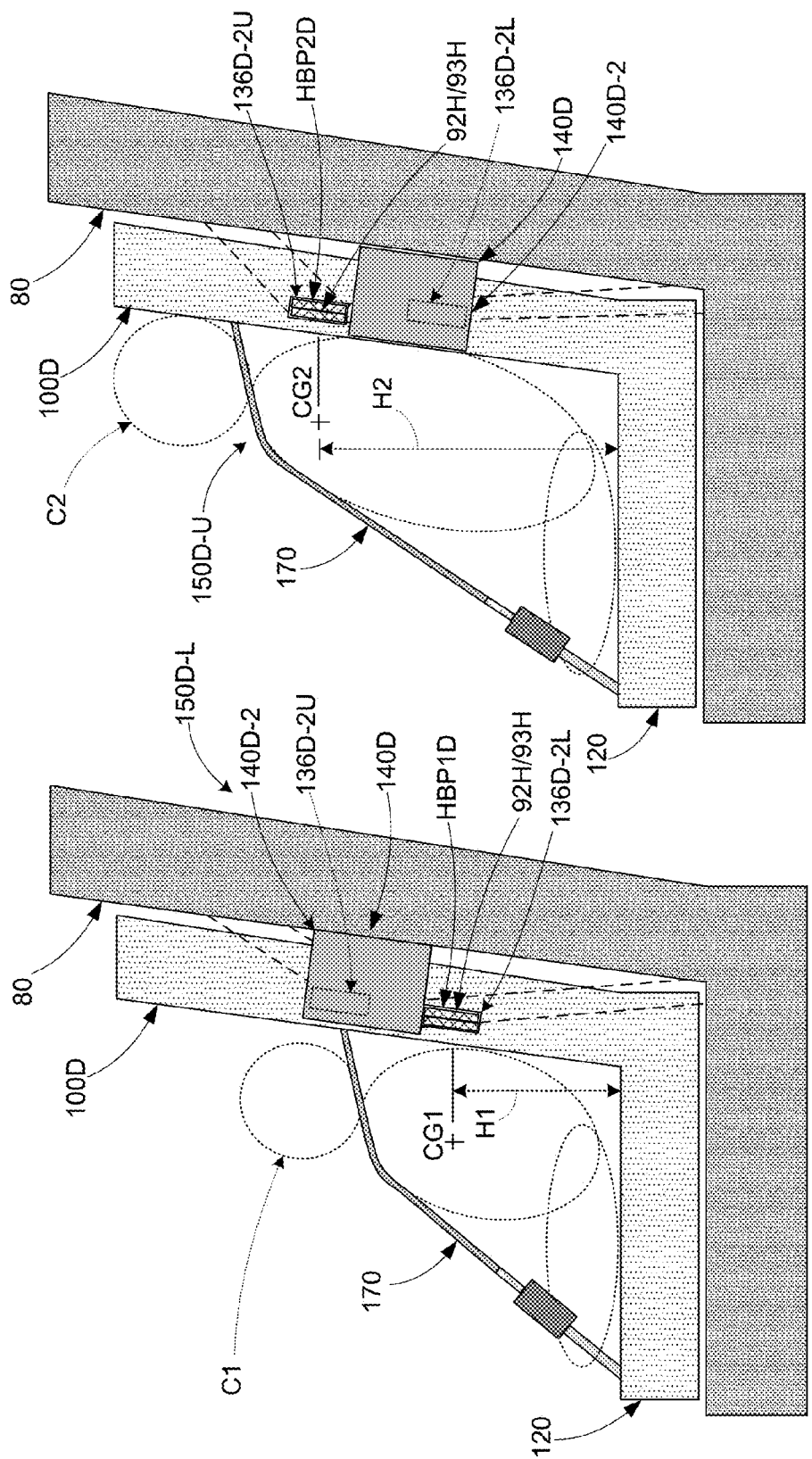
FIGS. 7(A) and 7(B) are simplified side views showing the child safety seat of FIG. 6 with the bracket-type belt adjustment mechanism in two different fixed operating states.

FIGS. 7(A) and 7(B) show assembly 100D in two alternate fixed states. FIG. 7(A) shows seat assembly when belt adjustment mechanism 150D is in a first fixed state (i.e., with bracket 140D disposed in a raised position) to secure a smaller child C1. In the raised position, belt-guide flange 140D-2 covers associated upper region 136D-2U of belt-positioning opening 136D-2, and a corresponding horizontal belt path opening is formed by lower region 136D-2L of belt-positioning opening 136D-2 (i.e., between lower edge 148D-2L of belt-guide flange 140D-2 and lower peripheral edge 138D-2L). Referring briefly to FIG. 6, at the same time, belt-guide flange 140D-1 simultaneously covers associated upper region 136D-1U of belt-positioning opening 136D-1, and a second horizontal belt path opening is formed by lower region 136D-1L between lower edge 148D-1L of belt-guide flange 140D-1 and lower peripheral edge 138D-1L of belt-positioning opening 136D-1. Referring back to FIG. 7(A), when connected to vehicle seat 80, seat belt portions 92H and 93H are restricted to pass through the first and second horizontal belt path openings (i.e., such that belt portions 92H and 93H pass through lower belt-positioning opening 136D-2L), thereby forming "lowered" horizontal belt path HBP1D at a height H1 that generally coincides with the vertical position of center of gravity CG1 of smaller child C1.

FIG. 7(B) shows seat assembly when belt adjustment mechanism 150D is in a second fixed state (i.e., with bracket 140D disposed in a lowered position) to secure a taller child C2. In the lowered position, belt-guide flange 140D-2 covers associated lower region 136D-2L of belt-positioning opening 136D-2, and a corresponding horizontal belt path opening is formed by upper region 136D-2U of belt-positioning opening 136D-2 (i.e., between upper edge 148D-2U of belt-guide flange 140D-2 and upper peripheral edge 138D-2U). Referring briefly to FIG. 6, at the same time, belt-guide flange 140D-1 simultaneously covers associated lower region 136D-1L of belt-positioning opening 136D-1, and a second horizontal belt path opening is formed by upper region 136D-1U between upper edge 148D-1U of belt-guide flange 140D-1 and upper peripheral edge 138D-1U of belt-positioning opening 136D-1. Referring back to FIG. 7(B), when connected to vehicle seat 80, seat belt portions 92H and 93H are restricted to pass through the first and second horizontal belt path openings (i.e., such that belt portions 92H and 93H pass through lower belt-positioning opening 136D-2U), thereby forming "raised" horizontal belt path HBP2D at a height H2 that generally coincides with the vertical position of center of gravity CG2 of taller child C2.

According to another aspect of the bracket-type approach, both shoulder belt straps 95-1 and 95-2 are supported by horizontally aligned structures in both the first and second fixed states, so both shoulder belt straps 95-1 and 95-2 apply equal forces on the restrained child during an accident, thereby minimizing the chance of injury. For example, when belt adjustment mechanism 150D is in the first fixed state (i.e., bracket 140D is disposed in a raised position), shoulder belt strap 95-2 is supported by upper peripheral edge 138D-2U (e.g., as indicated in FIG. 7(A)), and shoulder belt strap 95-1 is supported by upper peripheral edge 138D-1U (as mentioned above with reference to FIG. 6), so both shoulder belt straps 95-1 and 95-2 extend from upright portion 130D to the seated (smaller) child at the same optimal angle, resulting in substantially equal forces applied to both of the child's shoulders during an accident. Similarly, when belt adjustment mechanism 150D is in the second fixed state (i.e., bracket 140D is disposed in a lowered position), shoulder belt strap 95-2 is supported by upper edge 148D-2U of belt-guide flange 140D-2 (e.g., as indicated in FIG. 7(B)), and shoulder belt strap 95-1 is supported by upper edge 148D-1U of belt-guide flange 140D-1 (as mentioned above with reference to FIG. 6), so both shoulder belt straps 95-1 and 95-2 extend from upright portion 130D to the restrained taller child at a common angle that is optimized for a taller child. In addition, in embodiments (not illustrated) that allow bracket 140D to fixedly secured in one or more additional fixed states (e.g., in a position between the upper and lower positions illustrated in FIGS. 7(A) and 7(B)) to provide facilitate precise adjustment of the vertical anchor point openings, bracket 140D reliably maintains horizontally aligned vertical anchor points that minimize the chance of injury. That is, because connecting structure 141D maintains bracket 140D in a horizontal position relative to upright portion 130D2, upper edges 148D-1U and 148D-2U remain substantially horizontally aligned in any fixed position.

Figure 8:
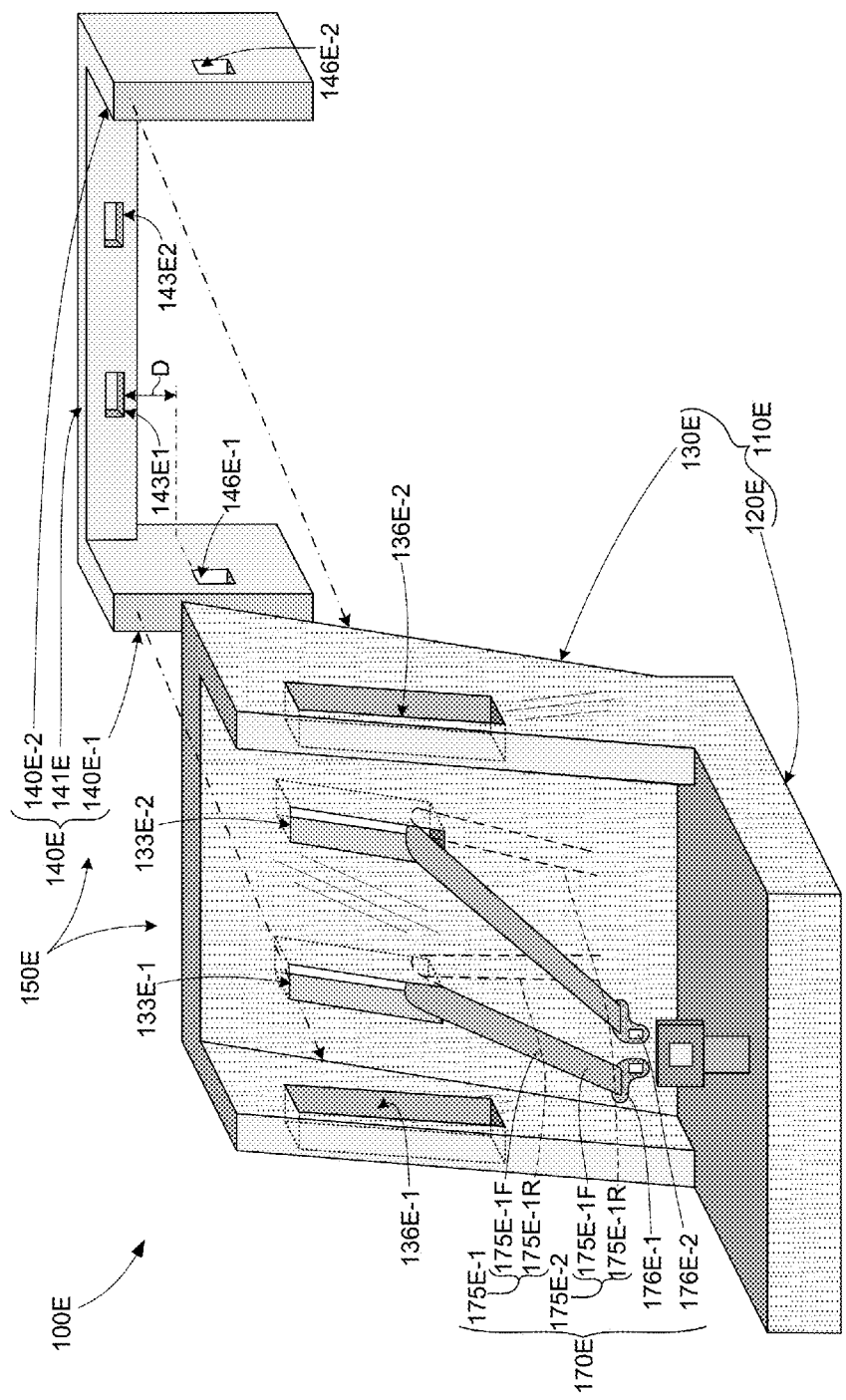
FIG. 8 is a top front perspective view showing a child safety seat including a second bracket-type belt adjustment mechanism according to another practical embodiment of the present invention.

FIG. 8 is an exploded perspective view showing a child safety seat assembly 100E having a second bracket-type belt adjustment mechanism 150E includes a bracket-type positioning member (bracket) 140E mounted on a seat shell 110E by way of a suitable securing structure (not shown). Similar to assembly 100D (discussed above), shell 110E includes a base portion 120E and an upright portion 130E as described above, where side flanges of upright portion 130E define elongated belt-positioning openings 136E-1 and 136E-2. Also similar to the previous embodiment, bracket 140E includes an integral structure having belt-guide flanges (positioning members) 140E-1 and 140E-2 rigidly connected by a connecting structure 141E.

Figure 9C:
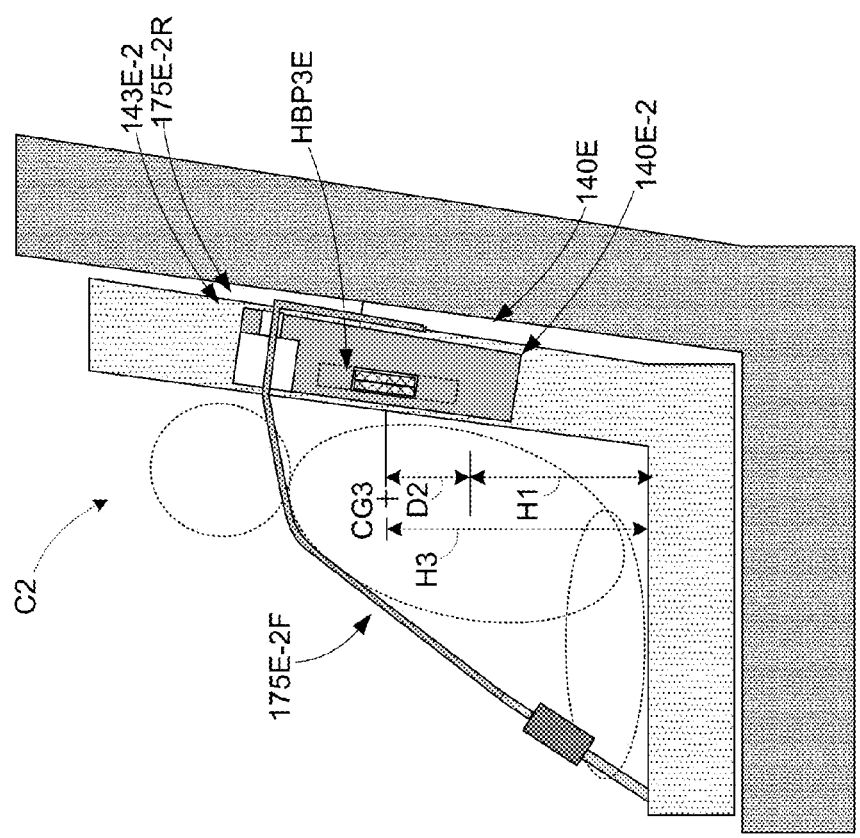
Figure 10A:
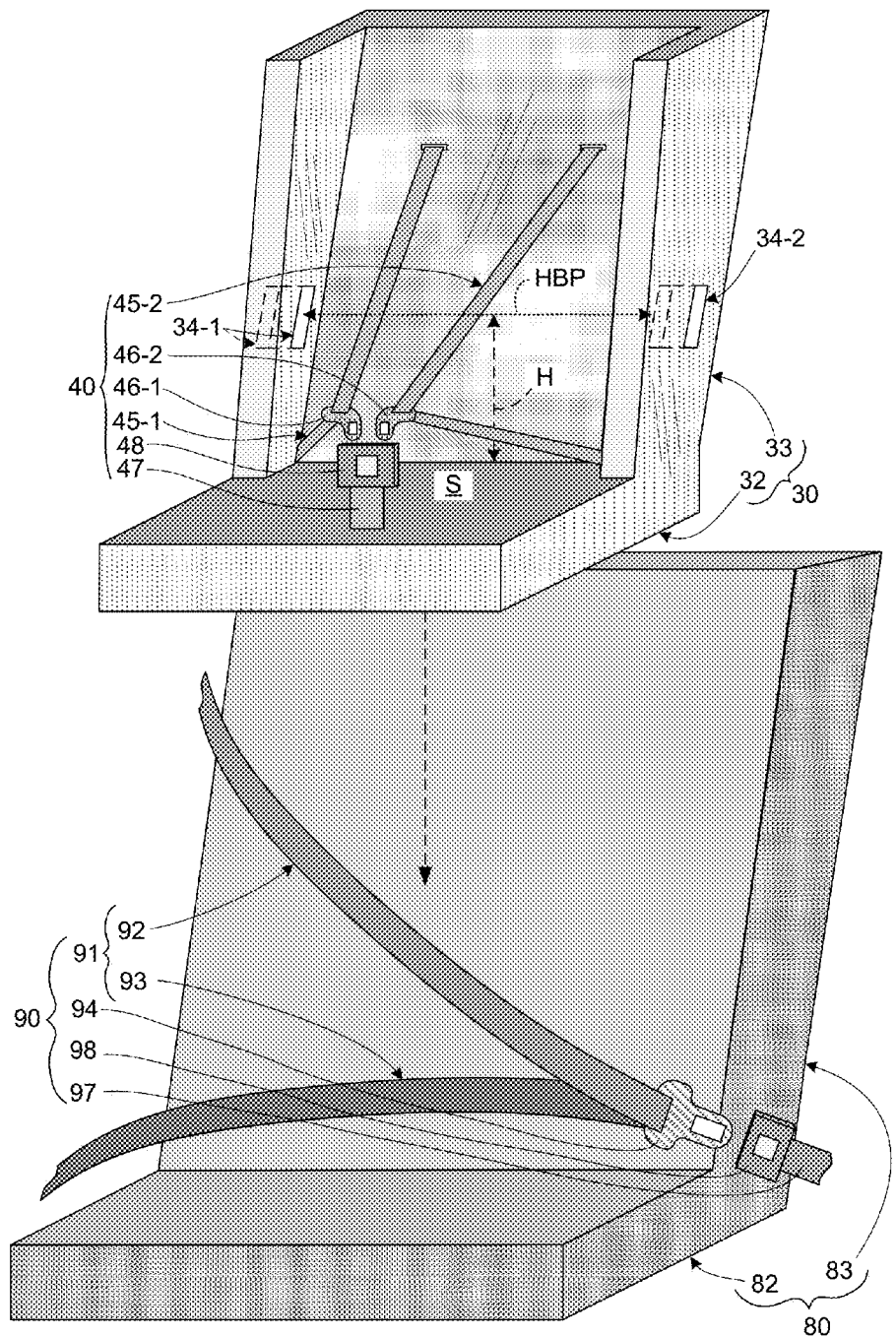
FIGS. 10(A) and 10(B) are exploded perspective and assembled perspective views showing a conventional child safety seat mounted on a vehicle seat.
Figure 10B:
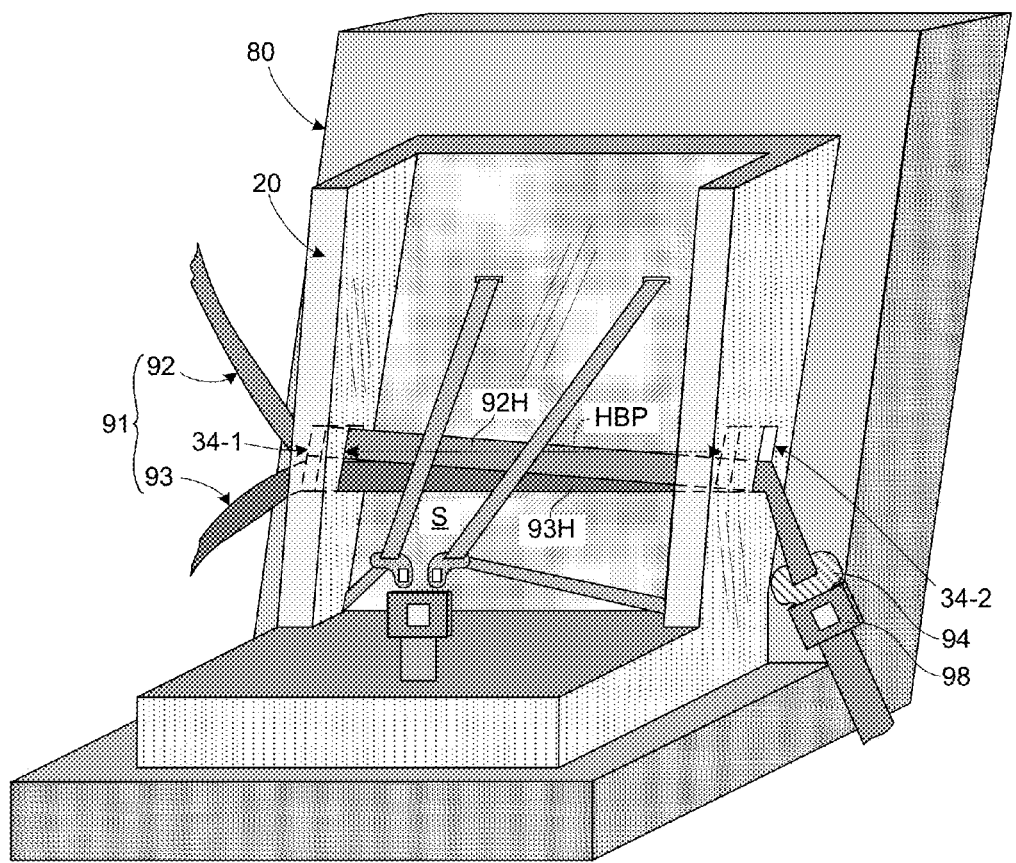
Figure 11B:
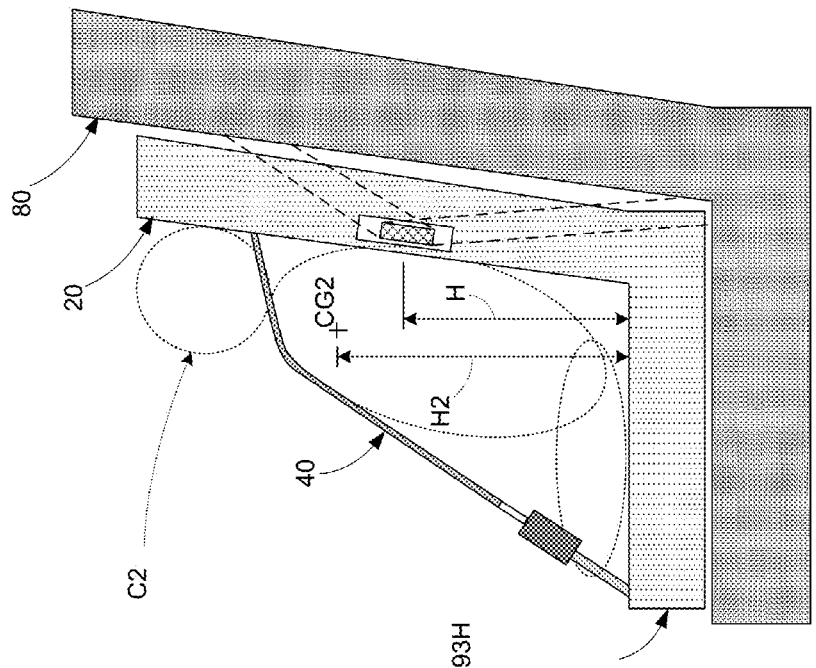
FIGS. 11(A) and 11(B) are simplified side views showing the conventional child safety seat in operation.
Figure 11A:
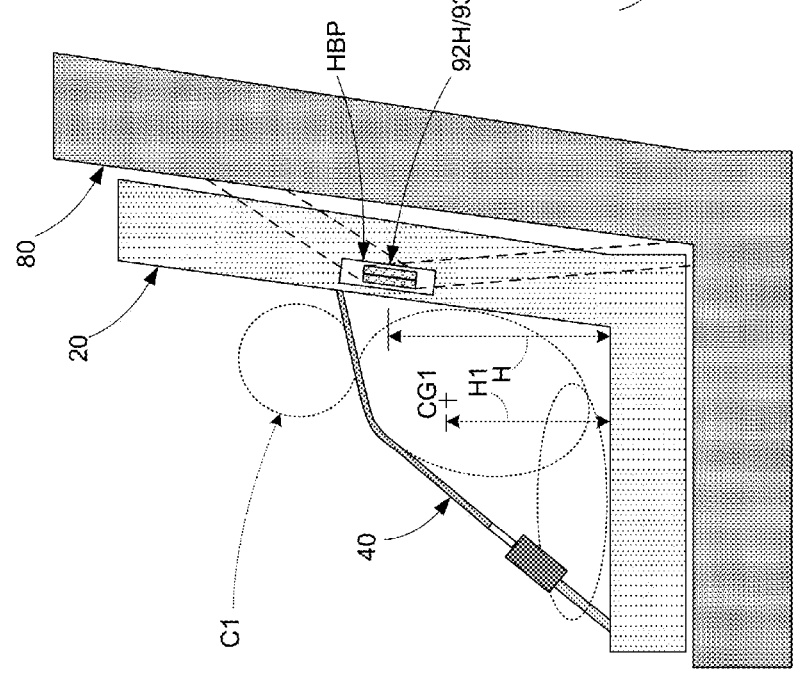

According to an aspect of the present embodiment, bracket 140E utilizes belt holes 146E-1 and 146-2, which are respectively defined through belt-guide flanges 140E-1 and 140E-2, to define the end points of the horizontal belt path along which vehicle seat belt (not shown) is trained to secure assembly 100E to a vehicle seat. That is, when bracket 140E is operably mounted on seat shell 110 (e.g., as described below with reference to FIGS. 9(A) to 9(C)), belt holes 146E-1 and 146-2 align with corresponding "exposed" portions of belt-positioning openings 136E-1 and 136E-2, respectively, and remaining "solid" portions of belt-guide flanges 140E-1 and 140E-2 obstruct remaining portions of belt-positioning openings 136E-1 and 136E-2, respectively. Accordingly, a horizontal belt path is formed as described above between belt holes 146E-1 and 146E-2 (and corresponding "exposed" portions of belt-positioning openings 136E-1 and 136E-2), and is ad by sliding or otherwise repositioning bracket 140E in a vertical direction along the back surface of seat upright portion 130E. For example, FIG. 9(A) shows bracket 140E disposed in a lowered fixed state, where upper portions of positioning member 140E-2 obstructs upper portion 136E-2U of second belt-positioning opening 136E-2, and horizontal belt path HBP1E (along which belt portions 92H and 93H pass in the manner described above) is formed through lower portion 136E-2L of belt-positioning opening 136E-2 and belt hole 146E-2. In contrast, as shown in FIG. 9(B), when bracket 140E is disposed in a raised fixed state, the lower portion of positioning member 140E-2 obstructs lower portion 136E-2L, and horizontal belt path HBP2E is formed through upper portions 136E-2U and belt hole 146E-2.

An advantage provided by bracket-type belt adjustment mechanism 150E is that, by providing the belt-positioning openings 136E-1 and 136E-2 as a single elongated opening (or optionally as a series of vertically-aligned openings), horizontal belt paths can be formed at substantially any vertical distance above seat base portion 120E (i.e., within the upper/lower limits of belt-positioning openings 136E-1 and 136E-2), thereby facilitating more precise alignment between the horizontal belt path and a child's center of gravity. For example, FIG. 9(A) shows bracket 140E disposed in the lowered fixed state in which horizontal belt path HBP1E is vertically aligned at height (vertical distance) H1 with center of gravity CG1 of smaller child C1, and FIG. 9(B) shows bracket 140E disposed in the raised fixed state in which horizontal belt path HBP2E is vertically aligned at height H2 with center of gravity CG2 of taller child C2. Note that, by providing a suitable connecting structure, bracket 140E can be disposed at any height between heights H1 and H2. For example, FIG. 9(C) shows bracket 140E disposed in an arbitrary "intermediate" fixed state in which horizontal belt path HBP3E is vertically aligned at height H3 with center of gravity CG3 of an intermediate-sized child C3.

Referring again to FIG. 8, according to yet another aspect, bracket-type belt adjustment mechanism 150E is further modified to provide adjustable vertical anchor point openings in order to facilitate simultaneous and coordinated adjustment of both the safety belt and a harness system 170E. Safety harness system 170E is operably attached to seat shell 110E in a manner similar to that described above with reference to the conventional safety seat, and serves secure a child in seating area defined by seat shell 100E. In this case, safety harness system 170E includes shoulder belt straps 175E-1 and 175E-2 that respectively include rear portions 175E-1R and 175E-2R (indicated by dashed lines) extending upward from behind upright portion 130E to elongated shoulder harness openings 133E-1 and 133E-2 that formed in the upright portion 130E of the seat shell 110E, and front portions 175E-1F and 175E-2F that extend downward from shoulder harness openings 133E-1 and 133E-2 to buckles 176E-1 and 176E-2, respectively. To facilitate simultaneous and coordinated adjustment of both the safety belt and a harness system 170E, harness slots 143E-1 and 143E-2 are defined through elongated connecting structure 141E and positioned to align with shoulder harness openings 133E-1 and 133E-2, thereby providing vertical anchor point openings through which harness straps 175E-1 and 175E-2 pass through upright portion 130E. For example, as indicated in FIG. 9(A), when bracket 140E is operably mounted in the lowered position, harness slot 143E-2 aligns with a lower portion of elongated shoulder harness opening 133E-2 to form a lower vertical anchor point opening 155E-2L through which shoulder harness strap 175E-2 passes through said upright portion 130E. As indicated in FIG. 9(B), when bracket 140E is subsequently moved upward into the raised position, harness slot 143E-2 aligns with an upper portion of elongated shoulder harness opening 133E-2 to form an upper vertical anchor point opening 155E-2U through which shoulder harness strap 175E-2 passes.

Because both harness slots 143E-1 and 143E-2 and belt holes 146E-1 and 146E-2 are formed on the same rigid integrally connected structure, when bracket 140E is adjusted between the lowered fixed state shown in FIG. 9(A) and the raised fixed state shown in FIG. 9(B), (i.e., such that a vertical height of the belt hole 146E-2 above seat base portion 120E is increased by a corresponding (first) distance D1 from vertical distances H1 to H2), the vertical height H3 of vertical anchor point opening 155E-12 above seat base portion 120E is simultaneously increased by the same distance D1. Similarly, when bracket 140E is adjusted upward by distance D2 to the intermediate position shown in FIG. 9(C)), both horizontal belt path HBPE3 and vertical anchor point opening 155E-13 are simultaneously adjusted by the same distance D2. Therefore, as indicated in FIG. 8, by positioning harness slots 143E-1 and 143E-2 at a predetermined offset distance D above belt holes 146E-1 and 146E-2, the horizontal belt path formed by the vertical position of bracket 140E is automatically simultaneously adjusted upward each time a parent adjusts harness should straps 175E-1 and 175E-2 to accommodate growth of their child, thereby minimizing the chance of injury due to misalignment between the horizontal belt path and the child's center of gravity.

Although the present invention has been described with respect to certain specific embodiments, it will be clear to those skilled in the art that the inventive features of the present invention are applicable to other embodiments as well, all of which are intended to fall within the scope of the present invention. For example, although the various belt adjustment mechanisms set forth herein are described with reference to two fixed operating states, any number of fixed operating states may be supported by providing belt adjustment mechanisms having sockets or fixtures configured to secure the positioning member in more than two positions. Moreover, although bracket-type belt adjustment mechanisms are described with specific reference to sliding-type mechanisms, a bracket-type belt adjustment mechanism may be implemented using a removable-type mechanism similar to that described with reference to FIGS. 3(A) to 3(D).

The invention claimed is:

1. A child safety seat assembly for securing a child to a vehicle seat using a standard safety belt, the child safety seat assembly comprising:
    a seat shell including a base portion and an upright portion extending upward from the base portion, wherein said upright portion includes a belt adjustment mechanism for providing a horizontal belt path along which portions of the standard safety belt pass to secure the seat shell to said vehicle seat, said belt adjustment mechanism including:
        first and second belt-positioning openings formed in the upright portion of the seat shell, and
        first and second positioning members adjustably connected to the upright portion such that the first and second positioning members are movable relative to the first and second belt-positioning openings between a first fixed state and a second fixed state,
    wherein when said belt adjustment mechanism is configured such that the first and second positioning members are disposed in the first fixed state, the first and second positioning members respectively obstruct first portions of the first and second belt-positioning openings and expose second portions of the first and second belt-positioning openings, whereby said horizontal belt path is formed between said exposed second portions of the first and second belt-positioning openings and disposed at a first vertical distance from the base portion, and
    wherein when said belt adjustment mechanism is configured such that the first and second positioning members are in the second fixed state, the first and second positioning members respectively obstruct said second portions of the first and second belt-positioning openings and expose said first portions of the first and second belt-positioning openings, whereby said horizontal belt path is formed between said exposed first portions of the first and second belt-positioning openings and disposed at a second vertical distance from the base portion, wherein the second vertical distance being greater than the first vertical distance.

2. The child safety seat of claim 1,
    wherein at least one of said first and second positioning members comprises a removable-type positioning member that is removably connected to a socket formed on the upright portion of the seat shell.

3. The child safety seat of claim 2,
    wherein the removable-type positioning member includes at least one first engaging structure,
    wherein the socket comprises a second engaging structure disposed on a periphery of one of said said first and second belt-positioning openings,
    wherein said first and second engaging structures are positioned and arranged to operably engage with each other when said removable-type positioning member is mounted into said socket.

4. The child safety seat of claim 3,
    wherein the removable-type positioning member includes a solid body structure defines a belt hole disposed adjacent to an end of the removable-type positioning member.

5. The child safety seat of claim 1, wherein at least one of said first and second positioning members comprises a slide-type positioning member including at least one engaging structure that is slidably engaged in a guide structure formed on the upright portion of the seat shell.

6. The child safety seat of claim 5,
    wherein the guide structure comprises an elongated slot is disposed on a periphery of one of said said first and second belt-positioning openings,
    wherein said at least one engaging structure comprises at least one protuberance that is slidably received inside said slot such that said slide-type positioning member is slidably connected to said upright portion of the seat shell.

7. The child safety seat of claim 6, wherein the slide-type positioning member includes a solid body structure defines a belt hole.

8. The child safety seat of claim 6, wherein said slide-type positioning member comprises a solid body structure that is smaller than said one of said said first and second belt-positioning openings.

9. The child safety seat of claim 1, wherein the belt adjustment mechanism comprises a bracket including said first and second positioning members integrally connected to opposite ends of an elongated connecting structure.

10. The child safety seat of claim 9, wherein the bracket comprises a single-piece, substantially U-shaped structure.

11. The child safety seat of claim 10,
wherein the bracket comprises an integrally molded plastic structure.

12. The child safety seat of claim 10,
wherein when said belt adjustment mechanism is configured such that the bracket is disposed in a raised fixed state, the first and second positioning members respectively obstruct upper portions of the first and second belt-positioning openings, and lower portions of the first and second belt-positioning openings disposed below the bracket are exposed, and
wherein when said belt adjustment mechanism is configured such that the bracket is disposed in a lowered fixed state, the first and second positioning members respectively obstruct said lower portions of the first and second belt-positioning openings, and said upper portions of the first and second belt-positioning openings are exposed.

13. The child safety seat assembly according to claim 12, wherein the bracket is slidably connected to a rear surface of the seat upright portion such that said bracket remains connected to said seat shell when moved between the first fixed state and the second fixed state.

14. The child safety seat assembly according to claim 9, wherein the bracket further comprises first and second belt holes respectively defined through said first and second positioning members, said belt holes being positioned and sized such that:
when said bracket is disposed in a lowered fixed state, upper portions of the first and second positioning members respectively obstruct upper portions of the first and second belt-positioning openings, and said horizontal belt path is formed through lower portions of the first and second belt-positioning openings and said first and second belt holes, respectively, and
when said bracket is disposed in a raised fixed state, lower portions of the first and second positioning members respectively obstruct said lower portions of the first and second belt-positioning openings, and said horizontal belt path is formed through said upper portions of the first and second belt-positioning openings and said first and second belt holes, respectively.

15. The child safety seat assembly according to claim 14, wherein the belt adjustment mechanism further comprises:
first and second elongated shoulder harness openings formed in the upright portion of the seat shell, and
first and second harness slots defined in the elongated connecting structure,
wherein said first and second harness slots being positioned such that, when said bracket is operably mounted onto said seat shell such that said elongated connecting structure extends across a rear surface of said upright portion and said bracket is disposed in either of said lowered fixed state and said raised fixed state, said first and second harness slots are aligned with corresponding portions of said first and second elongated shoulder harness openings, respectively, thereby defining first and second vertical anchor point openings extending through said upright portion.

16. The child safety seat assembly according to claim 15, further comprising:
safety harness system including first and second shoulder belt straps including rear portions extending upward from behind the upright portion to said first and second vertical anchor point openings, respectively, and front portion extending from the first and second vertical anchor point openings, respectively over the base portion,
wherein when said bracket is adjusted from said lowered fixed state to said raised fixed state such that a vertical height of said first and second belt holes is increased by a first distance, a vertical height of said first and second vertical anchor point openings is simultaneously increased by said first distance.

* * * * *